(12) United States Patent
Butler (10) Patent No.: US 10,086,569 B2
(45) Date of Patent: Oct. 2, 2018

(54) METHOD OF MAKING A COMPOSITE SANDWICH STRUCTURE

(75) Inventor: Geoffrey A. Butler, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1086 days.

(21) Appl. No.: 12/779,381

(22) Filed: May 13, 2010

(65) Prior Publication Data

US 2011/0281114 A1    Nov. 17, 2011

(51) Int. Cl.
| | |
|---|---|
| B29C 70/44 | (2006.01) |
| B29C 70/08 | (2006.01) |
| B32B 3/12 | (2006.01) |
| B32B 5/18 | (2006.01) |
| B32B 5/24 | (2006.01) |
| B32B 7/06 | (2006.01) |
| B32B 7/12 | (2006.01) |
| B32B 27/06 | (2006.01) |
| B32B 27/38 | (2006.01) |

(52) U.S. Cl.
CPC ............ *B29C 70/44* (2013.01); *B29C 70/088* (2013.01); *B32B 3/12* (2013.01); *B32B 5/18* (2013.01); *B32B 5/24* (2013.01); *B32B 7/06* (2013.01); *B32B 7/12* (2013.01); *B32B 27/065* (2013.01); *B32B 27/38* (2013.01); *B32B 2266/00* (2013.01); *B32B 2605/08* (2013.01); *B32B 2605/12* (2013.01); *B32B 2605/18* (2013.01); *Y10T 428/31504* (2015.04)

(58) Field of Classification Search
None
See application file for complete search history.

(56) References Cited

U.S. PATENT DOCUMENTS

| | | | | |
|---|---|---|---|---|
| 5,022,952 | A | * | 6/1991 | Vaniglia ........................ 156/441 |
| 8,052,831 | B2 | | 11/2011 | Polus et al. |
| 2004/0198923 | A1 | * | 10/2004 | Hayashi et al. .............. 525/453 |
| 2005/0126699 | A1 | | 6/2005 | Yen et al. |
| 2005/0249937 | A1 | * | 11/2005 | Yamada et al. ............ 428/317.1 |
| 2006/0172111 | A1 | | 8/2006 | Polus et al. |
| 2007/0187024 | A1 | * | 8/2007 | Johnson et al. .............. 156/250 |
| 2010/0222461 | A1 | * | 9/2010 | Bongiovanni et al. ......... 524/35 |

FOREIGN PATENT DOCUMENTS

| | | |
|---|---|---|
| EP | 1595688 A1 | 11/2005 |
| WO | 2011142885 A1 | 11/2011 |

OTHER PUBLICATIONS

Cycom® 5320 Toughened Epoxy for Structural Applications, "Out-of-Autoclave Manufacturing.", Jul. 22, 2008.
International Search Report, dated Jul. 22, 2011, regarding Application No. PCT/US2011/028974 (WO2011142885), 2 pages.

(Continued)

*Primary Examiner* — Benjamin A Schiffman
(74) *Attorney, Agent, or Firm* — Yee & Associates, P.C.

(57) ABSTRACT

A composite sandwich structure is made by compacting a first multi-ply composite facesheet and assembling a layup, including sandwiching a core between the compacted first facesheet and a second multi-ply composite facesheet. The layup is compacted and the first and second facesheets are co-cured with the core.

19 Claims, 5 Drawing Sheets

(56) References Cited

OTHER PUBLICATIONS

"ACG MTM 45-1 Matrix Resin," UMECO Advanced Composites Group, PDS1205/11.07/3, Registered No. 2264869, copyright 2008, 9 pages.
"Cycom 5320-1 Epoxy Resin System," Technical Data Sheet, Cytec Engineered Materials, AECM-00017, May 12, 2010, 8 pages.
"X5320 Toughened Epoxy for Structural Applications Out-of-Autoclave Manufacturing," Preliminary Information Sheet, Cytec Engineered Materials, Revision 1.0, Mar. 9, 2008, 4 pages.
"CEM launches Out-of-Autoclave Toughened Epoxy Resin Prepreg System for Primary Structures," Cytec Engineered Materials, copyright 2009, 1 page, accessed Apr. 26, 2013, https://www.cytec.com/innovation/CEMhighlights.htrn.
"CYCOM 823 RTM Resin System," Technical Data Sheet, Ctyec Engineered Materials, Mar. 9, 2012, 6 pages.
European Patent Office Examination Report, dated Nov. 9, 2017, regarding Application No. 11718534.8, 4 pages.

\* cited by examiner

METHOD OF MAKING A COMPOSITE SANDWICH STRUCTURE

TECHNICAL FIELD

This disclosure generally relates to processes for making composite parts, and deals more particularly with an out-of-autoclave method of fabricating composite sandwich structures.

BACKGROUND

Composite sandwich structures may be used in a variety of applications because of their favorable strength-to-weight ratios. For example, such sandwich structures may be used, without limitation, in aerospace applications as lightweight structural panels. A typical composite sandwich used in the aerospace industry comprises a lightweight, high strength core sandwiched between a pair of composite facesheets, each formed from laminated plies of fiber reinforced polymer resin. In some cases, surface unevenness at the interface between the facesheets and the core may result in undesired properties in the cured structure due to less than desired compaction pressure applied to the facesheet plies during curing. In order to cause the interface surfaces of the facesheets and the core to conform to each other, the sandwich structure may be cured in an autoclave which applies sufficient pressure to the sandwich structure during curing to compact the facesheets and force the core and the facesheets to conform to each other. Alternatively, irregular features and/or surface unevenness on the facesheets may be substantially reduced by fully curing the facesheets prior to being assembled with the core in a secondary bonding operation. Still another solution to the problem involves machining the core to substantially match the irregular features or uneven surfaces of the facesheets.

Each of the solutions mentioned above may have disadvantages. Processing sandwich structures in autoclaves may be relatively expensive in terms of capital costs, and may be labor intensive because of the procedures required to prepare the sandwich structure for autoclave processing. Fully curing each of the facesheets prior to bonding them to the core may also be unsatisfactory because the core may have difficulty conforming to irregular features on facesheet surfaces that have hardened and become less compliant as a result of curing. Finally, machining the core surfaces to match those of the facesheets may be time consuming and labor intensive.

Accordingly, there is a need for a method of making composite sandwich structures that may be performed outside of an autoclave, and which allows co-curing of the facesheets with the core while minimizing porosities.

SUMMARY

The disclosed embodiments provide a method of making a composite sandwich structure that allows out-of-autoclave curing of the part layup, and which results in a structure exhibiting superior mechanical properties with minimum laminate voids and porosities. Out-of-autoclave processing according to the disclosed method may reduce capital costs, processing time and labor. Out-of-autoclave processing is made possible by the use of a dual temperature cure resin that allows partial curing and substantially full compaction of at least one of the facesheets before the sandwich layup is assembled and co-cured. Use of a dual temperature cure resin allows part curing under pressures achievable by conventional vacuum bag processing. Staging of the layup by partially curing one of the facesheets prior to part layup may increase the window of time during which chilled pre-preg material may be laid up after it is removed from refrigerated storage. This increased time window may allow processing of larger parts.

According to one disclosed embodiment, a method is provided of making a composite sandwich structure. The method comprises compacting a first multi-ply composite facesheet and assembling a layup, including sandwiching a core between the compacted first facesheet and a second multi-ply composite facesheet. The method further includes compacting the layup and co-curing the first and second facesheets. Compacting the first facesheet may be performed by placing the first facesheet in a vacuum bag on a tool and using atmospheric pressure to apply compaction pressure to the first facesheet through the bag by evacuating air from the bag. An outer surface of the first facesheet may be protected during compaction by placing a release film over the surface before the first facesheet is placed in the vacuum bag. The method further comprises curing the first facesheet at a first cure temperature while the first facesheet is being compacted. Co-curing the first and second facesheets is performed by heating the layup to at least approximately a second temperature higher than the first temperature. The method further comprises placing the layup on the tool with the first facesheet in face-to-face contact with the tool. Compacting the layup may be performed using vacuum bag processing by placing the layup on a tool, installing a vacuum bag over the layup, and substantially evacuating the bag of air.

According to another embodiment, a method is provided of making a composite sandwich structure comprising heating a first multi-ply reinforced facesheet to a first temperature sufficient to partially cure the facesheet, and compacting the first facesheet while the first facesheet is being heated. The method further comprises assembling a layup by placing a core between the first partially cured facesheet and a second multi-ply reinforced resin facesheet. The method also includes using a vacuum bag to compact the layup, and co-curing the first and second facesheets by heating the layup to a second temperature greater than the first temperature.

According to still another embodiment, a method is provided of making a composite sandwich structure using out-of-autoclave curing. The method comprises forming a first facesheet, including laying up multiple plies of a fiber reinforced dual-cure temperature resin, and placing the first facesheet on a tool within a sealed vacuum bag. The method also includes applying compaction pressure to the first facesheet by substantially evacuating the bag of air, and partially curing the first facesheet by heating the first facesheet to at least approximately one of the dual temperatures. The method further comprises assembling a layup, including sandwiching a core between the first partially cured and compacted facesheet and a second multi-ply fiber reinforced resin facesheet. The method also includes compacting the layup and curing the first and second facesheets by heating a layup to at least approximately the other of the dual temperatures.

BRIEF DESCRIPTION OF THE ILLUSTRATIONS

DETAILED DESCRIPTION

Figure 1:
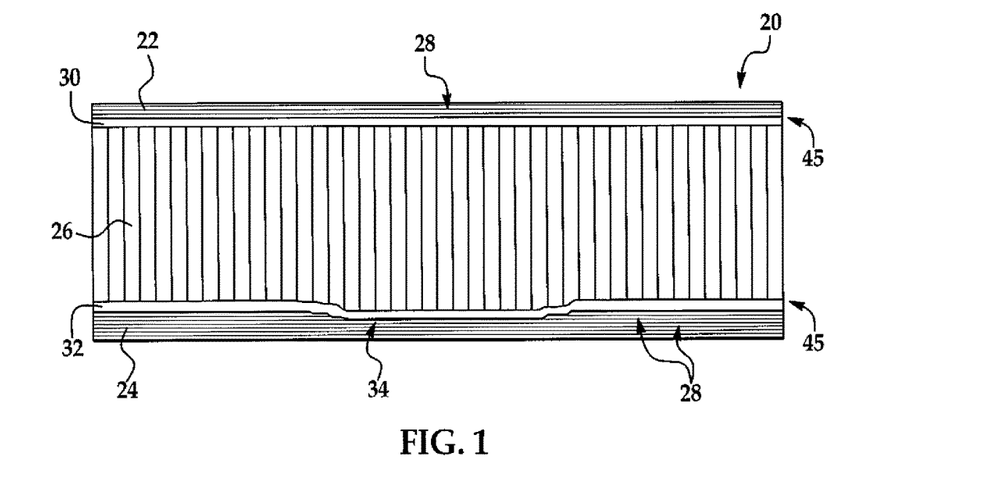
FIG. 1 is an illustration of a cross sectional view of a composite sandwich structure made according to the disclosed embodiments.

Referring first to FIG. 1, the disclosed embodiments provide a method of making a composite sandwich structure 20 comprising a core 26 sandwiched between first and second facesheets 24, 22 respectively. Each of the facesheets 22, comprises multiple plies 28 of a composite material, such as fiber reinforced resin. Optionally, a layer of adhesive 30, 32 may be used to aid in joining the facesheets 22, 24 to the core 26. The core 26 may comprise any of various materials such as a structural foam or a honeycomb that may or may not be filled, depending upon the application. One or more surface irregularities or areas of unevenness 34 may be present at the interface 45 between the facesheets 22, 24 and the core 26. In accordance with the disclosed embodiments, the facesheets 22, 24 may be co-cured with the core 26 in an out-of-autoclave process that may reduce porosities in the facesheets 22, 24, in spite of the presence of the surface irregularities 34.

Figure 2:
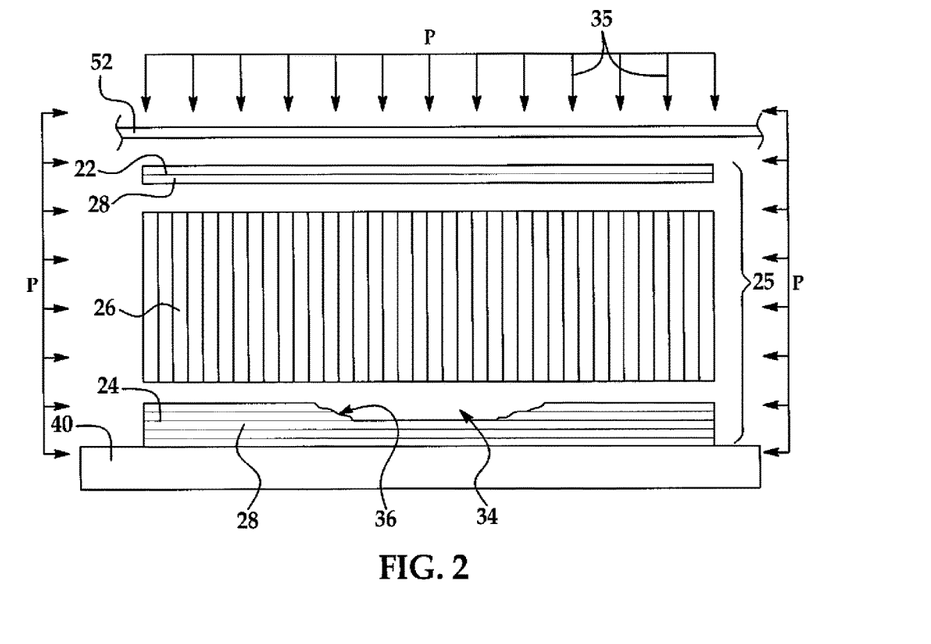
FIG. 2 is an illustration of an exploded, sectional view of a layup used to make the composite sandwich structure shown in FIG. 1.

FIG. 2 illustrates the component parts of the layup that are used to assemble the composite sandwich structure 20 shown in FIG. 1. The layup 25 comprises the core 26 sandwiched between the first and second facesheets 24, 22, respectively. The second facesheet 24, also sometimes referred to herein as the "tool-side" facesheet, is laid up on a suitable tool surface 40, which in the illustrated example, is substantially flat. However, the tool 40 may have one or more curves or other surface features which are imparted to the layup 25 during processing. In the illustrated example, the tool-side facesheet 24 includes a surface irregularity or unevenness that may be caused by any number of reasons, such as drop-offs in the plies 28 that form ramps 36.

As will be discussed below in more detail, the tool-side facesheet 24 is substantially fully compacted and partially cured when it is placed on the tool 40. The second facesheet 22, which may also be referred to as the "bag-side" facesheet, may or may not be compacted and/or partially cured when it is placed on the core 26 during assembly of the layup 25. A vacuum bag 52 is placed over the layup 25, is sealed to the tool 40 and is then evacuated during the cure process, resulting in atmospheric pressure of approximately 14 psi being applied to the layup 25. Evacuation of the bag 52 results in the atmospheric pressure "P" imposing an inward pressure on the bag 52, shown by the arrows 35, compacting the layup 25. The compaction process is carried out at elevated temperature, resulting in the co-curing of the facesheets 22, 24 with the core 26 to form a fully consolidated and cured composite sandwich structure 20 (FIG. 1).

Figure 3:
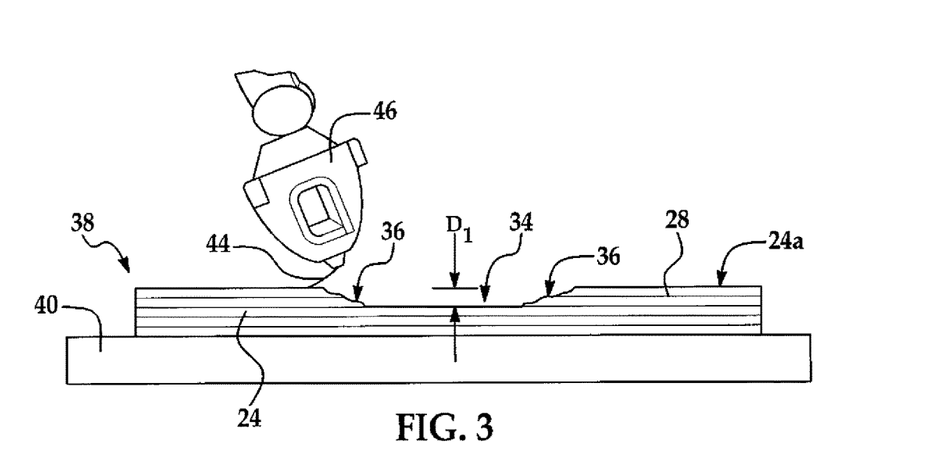
FIG. 3 is an illustration of a side view of the tool-side facesheet, showing a surface depression produced by ply drop-offs.
Figure 4:
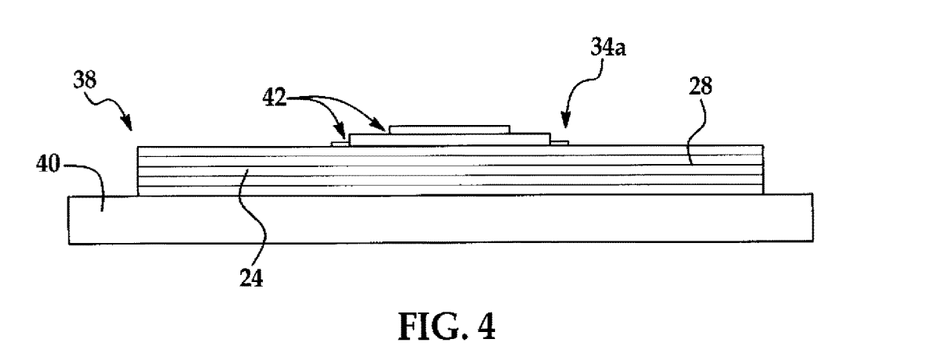
FIG. 4 is an illustration similar to FIG. 3 but showing a surface bump produced by ply doublers on the tool-side facesheet.

As previously mentioned, the tool-side facesheet 24 is substantially fully compacted and partially cured, or "staged", before the layup 25 (FIG. 2) is assembled. As shown in FIG. 3, the plies 28 of the facesheet 24 are successively laid up on a tool 40 according to a predefined ply schedule (not shown). The tool 40 may be the same tool that is used for the layup 25 shown in FIG. 2, or it may comprise a different tool. A computer controlled automatic fiber placement head 46, or other suitable means, may be used to form the plies 28 by laying down multiple courses of narrow strips of composite fiber tape, or tows. As previously mentioned, in the case of the illustrated example, a tool-side facesheet 24 may have one or more surface irregularities 34 in the form of a depression having a depth $D_1$ formed by ramps 36. However, as shown in FIG. 4, the surface irregularity 34 may comprise a raised area or bump 34a formed by any number of causes, such as by the presence of one or more ply doublers 42. In other embodiments, the facesheet 24 may have both depressions 34 and bumps 34a, in the same or in different areas of the facesheet 24.

Figure 5:
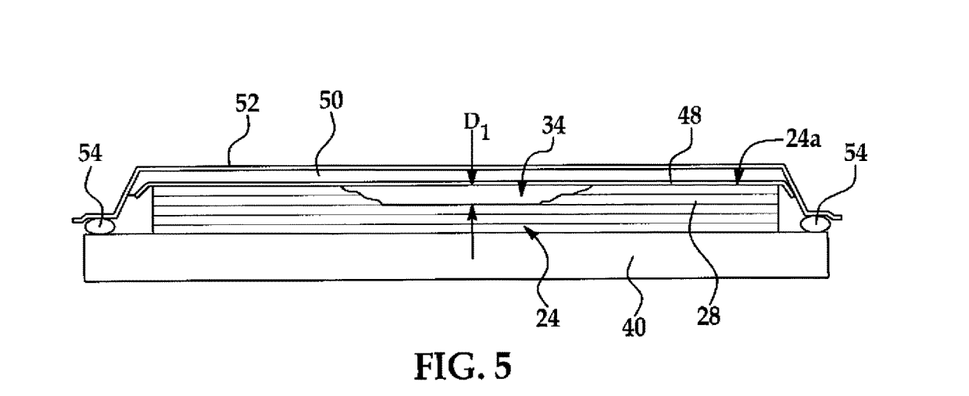
FIG. 5 is an illustration of a sectional view similar to FIG. 3, but showing the tool-side facesheet having been vacuum bagged prior to compaction and partial curing.

Referring now to FIG. 5, after the tool-side facesheet 24 has been laid up on the tool 40, a release film 48, which may comprise a dry or wet peel ply, may be applied over the facesheet 24 to both facilitate easy removal of the bag 52, and protect the upper surface 24a of the facesheet against surface marring, deformation and/or surface finish degradation during a subsequent compaction process. An optional breather 50 may be placed over the release film 48 to allow air flow during the subsequent evacuation process. A vacuum bag 52 is placed over the assembly of the facesheet 24, release film 48 and breather 50. The bag 52 may be a conventional vacuum bag, and may be sealed to the tool 40 by a suitable seal, such as seal 54 surrounding the facesheet 24.

Figure 6:
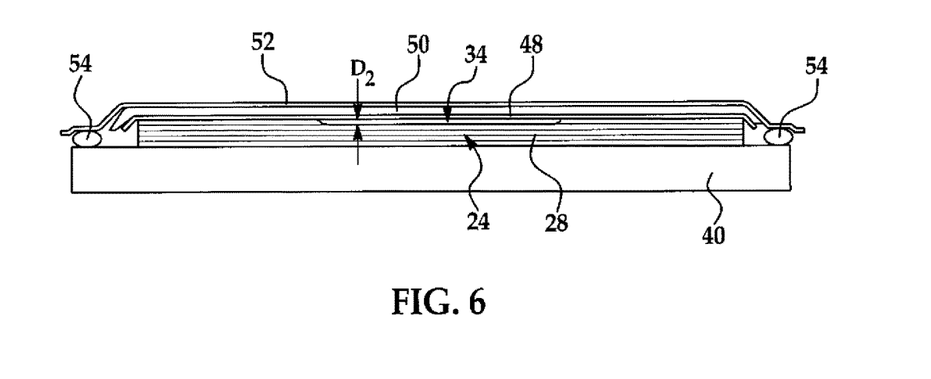
FIG. 6 is an illustration similar to FIG. 5 but showing the tool-side facesheet having been partially cured and substantially fully compacted.

Referring to FIG. 6, air is evacuated from the bag 52 through a valve or similar fitting (not shown) in the bag 52 while the facesheet 24 is subjected to an elevated temperature by means of a heating blanket, oven, infrared lamps, or other heating means (all not shown). In one embodiment, the tool-side facesheet may be heated to a "partial cure temperature" that equals or exceeds its glass transition temperature, softening the resin in the facesheet 24 and causing it to partially cure. The heating of the facesheet 24 to the partial cure temperature may be carried out in an oven (not shown) or by other techniques. In one embodiment, the partial cure cycle for one suitable commercially available dual temperature epoxy resin, resulting in an approximate 40% cure, may range between approximately 200° F. for eight hours to approximately 250° F. for two hours. This softening of the facesheet 24 in combination with the pressure applied by the bag 52 compacts the plies 28 of the facesheet 24, which may reduce the depth of irregularities 34 from the original depth $D_1$ to a depth $D_2$, as shown in FIG. 6.

Figure 7:
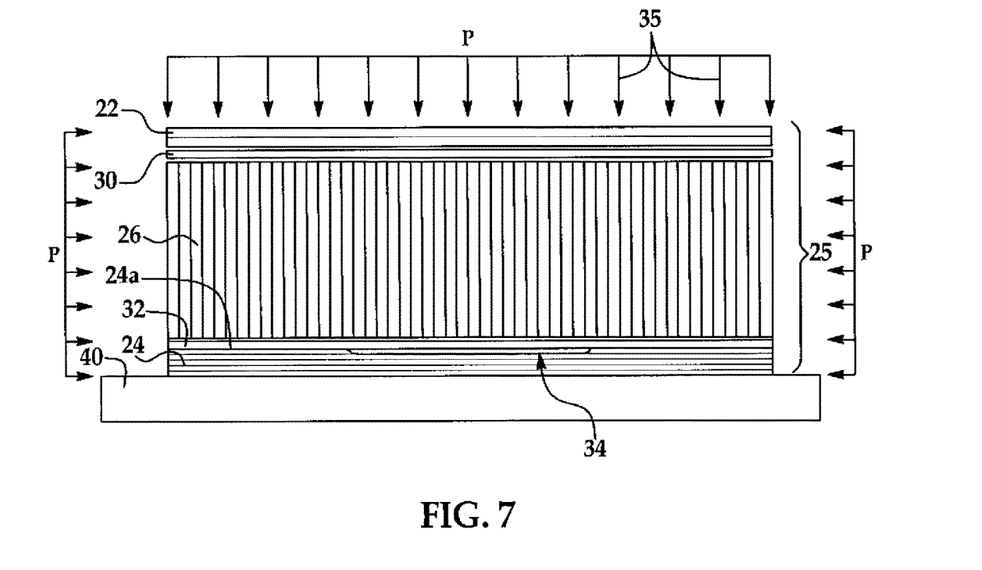
FIG. 7 is a sectional view of a composite sandwich structure layup prior to being vacuum bagged and co-cured.
Figure 8:
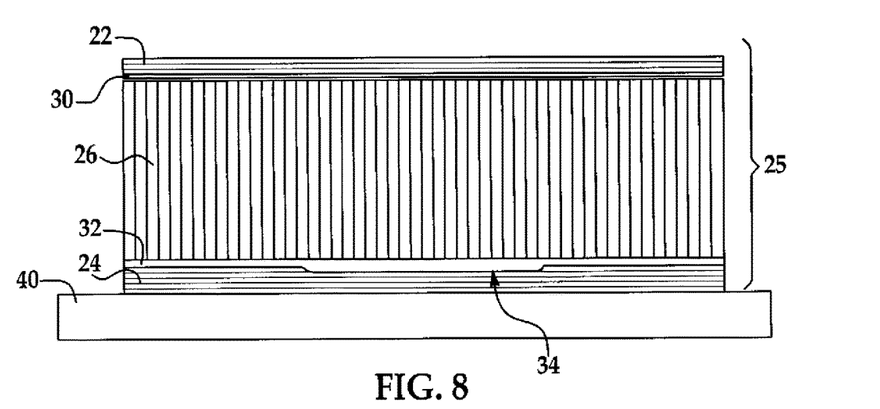
FIG. 8 is an illustration similar to FIG. 7 but showing the layup having been fully compacted and co-cured.

Referring now to FIG. 7, after the tool-side facesheet 24 has been substantially fully compacted and partially cured, a composite sandwich layup 25 is assembled on the tool 40, in which the tool-side facesheet 24 is placed between the core 26 and the tool 40, and the second, bag-side facesheet 22 is placed on top of the core 26. In the illustrated example, optional layers of adhesive 30, 32 are placed between the core 26 and the facesheets 22, 24 to aid in the bonding process. The layup 25 is then vacuum bagged and heated to at least a second, higher cure temperature, which in one example is approximately 350° F. Maintaining the temperature at 350° F. for a period of approximately 2 hours results in full curing of the dual temperature resin. As a result of this vacuum bag processing at the higher of the two dual cure temperatures, the plies 28 of the first facesheet 24 are compacted and consolidated, and the surface 24a of the tool-side facesheet 24, including the surface irregularities 34 are made to more intimately conform to the core 26, as shown in FIG. 8.

Figure 9:
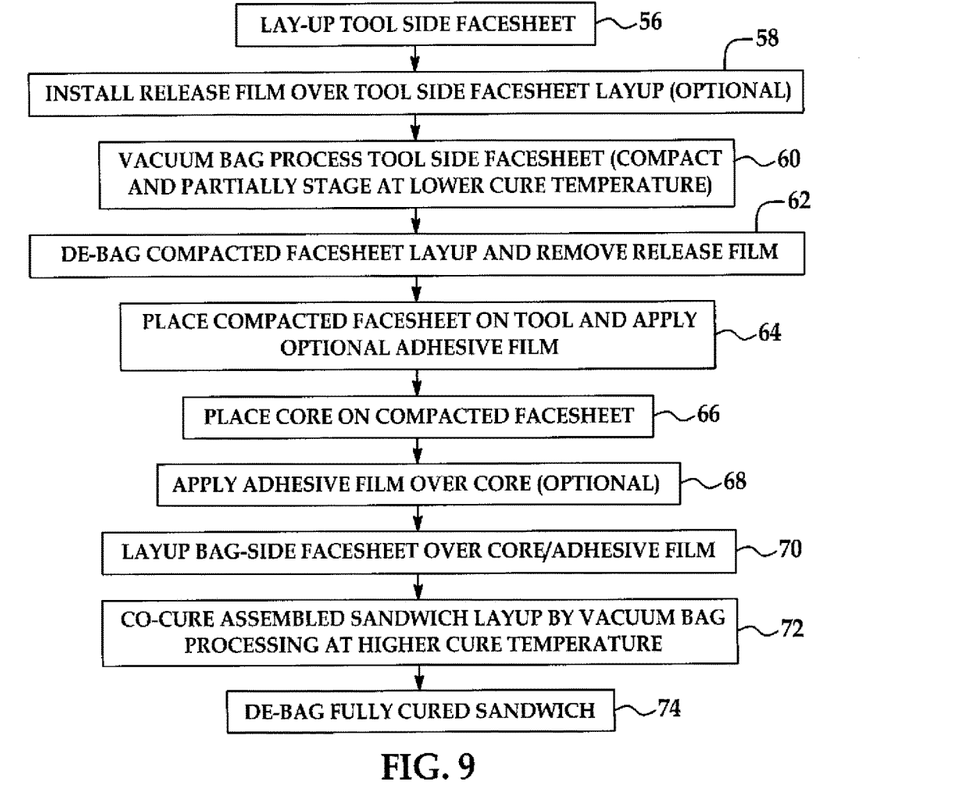
FIG. 9 is an illustration of a flow diagram showing the steps of a method of making a composite sandwich structure according to the disclosed embodiments.

Attention is now directed to FIG. 9 which broadly illustrates the steps of a method of making the composite sandwich structure 20 according to the disclosed method embodiments. Beginning at step 56, plies 28 of the tool-side facesheet 24 are laid up on a suitable tool 40, using either a hand layup process or an automatic fiber placement machine. Next, at step 58, a release film 48 is optionally applied over the upper surface 24a of the tool-side facesheet 24. At step 60, the tool-side facesheet 24 is placed in a vacuum bag and is substantially fully compacted while being partially staged or cured at the lower cure temperature of the dual temperature resin used in the facesheet 24. Partial staging of the facesheet 24 may be carried out by heating the facesheet 24 in an oven (not shown) or by other means. At step 62, the substantially fully compacted and partially cured tool-side facesheet 24 is debagged and the release film 48 is removed.

Next, at 64, the compacted facesheet 24 is placed on a tool 40 and an optional layer or film of adhesive 32 is applied to the facesheet 24. Then, as shown at 66, the core 26 is placed on top of the tool-side facesheet 24, and at step 68 an optional layer or film of adhesive 30 is applied over the core 26. Next, as shown at step 70, the bag-side facesheet 22 is laid up over the core 26. At step 72, the assembled sandwich layup 25 is co-cured by vacuum bag processing at the higher cure temperature of the dual temperature resin, thereby fully curing the resin. Finally, at step 74, the fully cured composite sandwich structure 20 is debagged.

Figure 10:
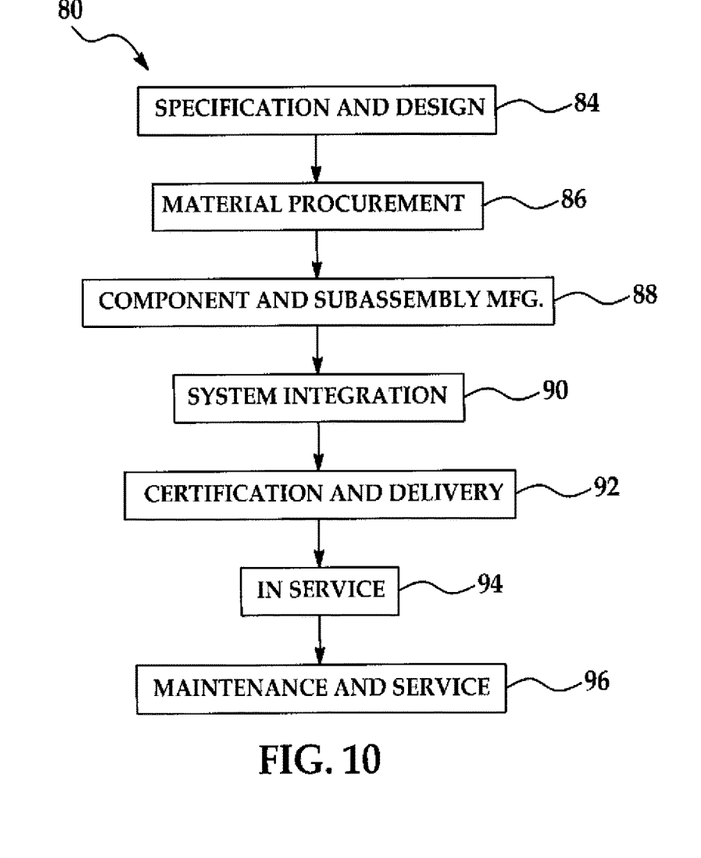
FIG. 10 is an illustration of a flow diagram of aircraft production and service methodology.
Figure 11:
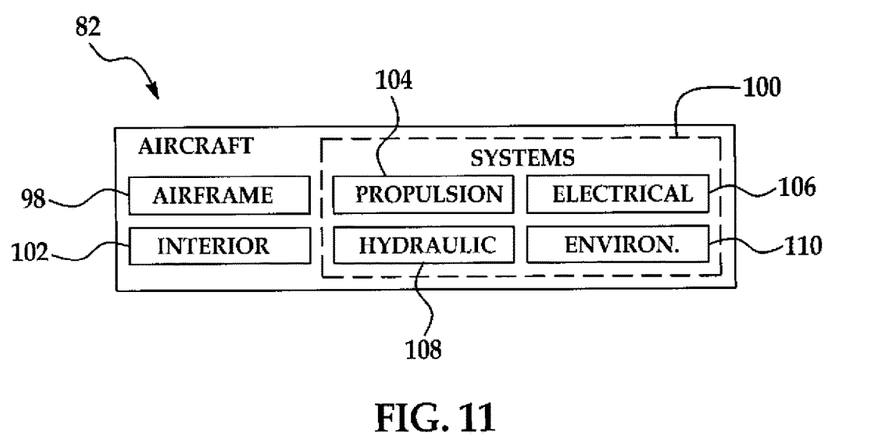
FIG. 11 is an illustration of a block diagram of an aircraft.

Embodiments of the disclosure may find use in a variety of potential applications, particularly in the transportation industry, including for example, aerospace, marine and automotive applications. Thus, referring now to FIGS. 10 and 11, embodiments of the disclosure may be used in the context of an aircraft manufacturing and service method 80 as shown in FIG. 10 and an aircraft 82 as shown in FIG. 11. Aircraft applications of the disclosed embodiments may include, for example, a wide variety of structural composite parts and components that employ sandwich type structures. During pre-production, exemplary method 80 may include specification and design 84 of the aircraft 82 and material procurement 86. During production, component and subassembly manufacturing 88 and system integration 90 of the aircraft 82 takes place. Thereafter, the aircraft 82 may go through certification and delivery 92 in order to be placed in service 94. While in service by a customer, the aircraft 82 is scheduled for routine maintenance and service 96 (which may also include modification, reconfiguration, refurbishment, and so on).

Each of the processes of method 80 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 82 produced by exemplary method 80 may include an airframe 98 with a plurality of systems 100 and an interior 102. Examples of high-level systems 100 include one or more of a propulsion system 104, an electrical system 106, a hydraulic system 108, and an environmental system 110. Any number of other systems may be included. The disclosed method may be employed to sandwich structures such as panels used in the interior 102 and in the airframe 98. Although an aerospace example is shown, the principles of the disclosure may be applied to other industries, such as the marine and automotive industries.

Systems and methods embodied herein may be employed during any one or more of the stages of the production and service method 80. For example, parts, structures and components corresponding to production process 88 may be fabricated or manufactured in a manner similar to parts, structures and components produced while the aircraft 82 is in service. Also, one or more apparatus embodiments, method embodiments, or a combination thereof may be utilized during the production stages 88 and 90, for example, by substantially expediting assembly of or reducing the cost of an aircraft 82. Similarly, one or more of apparatus embodiments, method embodiments, or a combination thereof may be utilized while the aircraft 82 is in service, for example and without limitation, to maintenance and service 96.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of making a composite sandwich structure, comprising:
    placing a first multi-ply composite on a tool, the first multi-ply composite comprising multiple plies of fiber reinforced with resin, the resin comprising a dual cure temperature resin, the first multi-ply composite defining an irregularity having a first depth;
    compacting the first multi-ply composite in a vacuum bagging operation so as to form a first facesheet from the multiple plies of fiber and the resin, the vacuum bagging operation excluding an external addition of resin to the first multi-ply composite on the tool, the compacting reducing the first depth of the irregularity to a second depth;
    curing the first facesheet at a first cure temperature while the first facesheet is being compacted;
    assembling a layup, including sandwiching a core between the compacted first facesheet and a second facesheet, the second facesheet comprising multiple plies of fibers reinforced with the dual cure temperature resin;
    compacting the layup in a vacuum bagging operation without the introduction or removal of resin to the layup through a vacuum bag; and
    co-curing the first and second facesheets by heating the layup to at least approximately a second temperature higher than the first temperature.

2. The method of claim 1, wherein compacting the first facesheet is performed by:
    placing the first facesheet in a vacuum bag on a tool, and drawing a vacuum in the vacuum bag so as to use atmospheric pressure to apply compaction pressure to the first facesheet through the bag by evacuating air from the bag.

3. The method of claim 2, further comprising:
protecting an outer surface of the first facesheet during the compaction by placing a release film over the surface before the first facesheet is placed in the vacuum bag.

4. The method of claim 1, wherein assembling the layup includes:
placing a layer of adhesive between the first facesheet and the core, and
placing a layer of adhesive between the second facesheet and the core.

5. The method of claim 1, further comprising:
placing the layup on a tool with the first facesheet in face-to-face contact with the tool.

6. The method of claim 1, wherein compacting the layup is performed by:
placing the layup on a tool,
installing a vacuum bag over the layup,
substantially evacuating the vacuum bag of air.

7. The method of claim 1, wherein the irregularity in the first face sheet further comprises a ply ramp or a ply depression formed by the multiple strips of composite tape.

8. A method of making a composite sandwich structure, comprising:
placing a first multi-ply composite on a tool, the first multi-ply composite comprising multiple plies of fiber reinforced with resin, the resin comprising a dual cure temperature resin, the placing including laying down multiple strips of composite fiber tape so as to form the multiple plies and the multiple strips of composite fiber defining an irregularity having a first depth;
heating the first multi-ply composite to a first temperature sufficient to partially cure the resin in the first multi-ply composite, the first multi-ply composite forming a first facesheet;
compacting the first facesheet while the first facesheet is being heated, the compacting including a vacuum bagging of the first multi-ply composite without an external addition of resin to the first multi-ply composite on the tool, the compacting reducing the first depth of the irregularity to a second depth;
placing a core on the first facesheet;
placing a second multi-ply composite on the core, the second multi-ply composite comprising multiple plies of fiber reinforced with the dual cure temperature resin, the core positioned between the first facesheet and the second multi-ply composite, the first facesheet, core, and second multi-ply composite forming a layup resting on the tool;
placing the layup in a vacuum bag on the tool;
drawing a vacuum in the vacuum in the vacuum bag so as to compact the layup without the introduction or removal of resin to the layup through the vacuum bag; and
co-curing the first facesheet and second multi-ply composite so as to fully cure the resin in the first facesheet and the second multi-ply composite by heating the layup to a second temperature greater than the first temperature, the second multi-ply composite forming a second facesheet.

9. The method of claim 8, wherein compacting the first facesheet is performed by:
placing the facesheet in a vacuum bag on a tool, and drawing a vacuum in the vacuum bag so as to use atmospheric pressure to apply compaction pressure to the facesheet through the bag by evacuating air from the bag.

10. The method of claim 8, further comprising:
protecting an outer surface of the first facesheet during the compaction by placing a release film over the surface before the compaction is performed.

11. The method of claim 8, wherein assembling the layup includes:
placing a layer of adhesive between the first facesheet and the core, and
placing a layer of adhesive between the second facesheet and the core.

12. The method of claim 8, further comprising:
placing the layup on a tool with the first facesheet in face-to-face contact with the tool.

13. The method of claim 8, wherein the irregularity in the first face sheet further comprises a ply ramp or a ply depression.

14. A method of making a composite sandwich structure using out-of-autoclave curing, comprising:
placing a first facesheet on a tool within a vacuum bag, the first facesheet comprising multiple plies of fiber reinforced with a dual cure temperature resin, the placing including laying down multiple strips of composite fiber tape so as to form the multiple plies of fiber and the multiple strips of composite fiber defining an irregularity having a first depth;
applying compaction pressure to the first facesheet by substantially evacuating the vacuum bag of air, no resin external to the vacuum bag added to the first facesheet while the first facesheet is within the vacuum bag on the tool;
partially curing the dual cure temperature resin of the first facesheet by heating the first facesheet to at least approximately a first one of dual temperatures of the dual cure temperature resin, the applying compaction pressure and partially curing reducing the first depth of the irregularity to a second depth;
assembling a layup, including sandwiching a core between the first partially cured and compacted facesheet and a second facesheet comprising multiple plies of fiber reinforced with the dual cure resin, the layup also positioned on the tool;
compacting the layup in a vacuum bag without the introduction or removal of resin to the layup through the vacuum bag; and
curing the dual cure temperature resin of the first and the second facesheets by heating the layup to at least approximately a second one of the dual temperatures of the dual cure temperature resin.

15. The method of claim 14, further comprising:
maintaining the first facesheet at the first one of the dual cure temperatures for a first preselected period of time; and
maintaining the layup at the second one of the dual cure temperatures for a second preselected period of time.

16. The method of claim 14, wherein:
the first one of the dual cure temperatures is between approximately 200° F. for at least eight hours and 250° F. for at least two hours, and
the second one of the dual temperatures is at least approximately 350° F. for at least two hours.

17. The method of claim 14, further comprising:
placing a layer of adhesive between the core and the first facesheet, and placing a second layer of adhesive between the core and the second facesheet.

18. The method of claim 14, wherein the irregularity in the first face sheet further comprises one of a ply ramp or a ply doubler.

19. A method of making a composite sandwich structure using out-of-autoclave curing, comprising:

placing a first multi-ply composite on a tool, the first multi-ply composite comprising multiple plies of fiber reinforced with a dual cure temperature resin, the placing, including using an automatic fiber placement machine to layup multiple plies of a fiber reinforced with the dual cure temperature resin on a tool, and resulting in an uneven facesheet surface, the uneven facesheet surface comprising a ply ramp, a ply doubler, a ply depression, or a ply ramp and a ply depression, the uneven facesheet comprising an irregularity having a first depth, the placing including laying down multiple strips of composite fiber tape so as to form the multiple plies;

protecting the uneven surface by placing a release film on the uneven surface;

placing a vacuum bag over the first facesheet and sealing the bag to the tool;

elevating the temperature of the first facesheet within the bag to a first one of dual temperatures of the dual cure temperature resin, the first one of the dual temperatures comprising at least the glass transition temperature of the dual cure temperature resin;

reducing the unevenness of the uneven surface, including compacting the first facesheet substantially completely by applying a vacuum to the bag, no resin external to the vacuum bag added to the first facesheet while the first facesheet is within the vacuum bag on the tool and no resin removed from the first facesheet through the vacuum bag while the vacuum bag is on the tool, the reducing including lessening the first depth of the irregularity to a second depth;

maintaining the first facesheet at the first one of the dual temperatures while the vacuum is maintained for a preselected period of time sufficient to partially cure the first facesheet;

debagging the fully compacted and partially cured first facesheet;

assembling a layup on the same tool, including sandwiching a core between the first partially cured and compacted facesheet and a second facesheet;

placing a first layer of adhesive between the first facesheet and the core;

placing a second layer of adhesive between the core and the second facesheet;

placing a vacuum bag over the layup and sealing the bag to the tool;

compacting the layup by drawing a vacuum in the bag;

fully co-curing the first and second facesheets, the core and the first and second layers of adhesive by heating the layup to at least the second one of the dual cure temperatures, and maintaining the temperature of the layup at the second one of the temperatures for a preselected length of time, first one of the dual cure temperatures is between approximately 200° F. for at least eight hours and 250° F. for at least two hours, and the second one of the dual temperatures is at least approximately 350° F. for at least two hours; and debagging the layup.

* * * * *

UNITED STATES PATENT AND TRADEMARK OFFICE
CERTIFICATE OF CORRECTION

PATENT NO. : 10,086,569 B2
APPLICATION NO. : 12/779381
DATED : October 2, 2018
INVENTOR(S) : Butler Page 1 of 1

It is certified that error appears in the above-identified patent and that said Letters Patent is hereby corrected as shown below:

In the Claims

Column 6, Line 66, change "on a tool" to --on the tool--
Column 7, Line 16, change "on a tool" to --on the tool--
Column 7, Line 20, change "on a tool" to --on the tool--
Column 7, Line 66, change "in a vacuum bag on a tool" to --in the vacuum bag on the tool--
Column 8, Line 15, change "on a tool" to --on the tool--
Column 8, Line 45, change "in a vacuum bag" to --in the vacuum bag--
Column 9, Line 13, change "on a tool" to --on the tool--
Column 10, Line 19, change "placing a vacuum bag" to --placing the vacuum bag--

Signed and Sealed this
Seventh Day of May, 2019

Andrei Iancu
*Director of the United States Patent and Trademark Office*